US005316559A

United States Patent [19]
Klievoneit et al.

[11] Patent Number: 5,316,559
[45] Date of Patent: May 31, 1994

[54] DICING BLADE COMPOSITION

[75] Inventors: Harold R. Klievoneit, Mesa; Augustine G. Esposito, Phoenix; Robert C. Runyon, Sun City West, all of Ariz.

[73] Assignee: St. Florian Company

[21] Appl. No.: 809,310

[22] Filed: Dec. 18, 1991

[51] Int. Cl.$^5$ ................................ B24B 1/00
[52] U.S. Cl. ........................ 51/295; 51/293; 51/308; 51/309; 51/206 R
[58] Field of Search ............ 51/293, 295, 308, 309, 51/206 R; 204/49

[56]        References Cited
       U.S. PATENT DOCUMENTS

| | | | |
|---|---|---|---|
| 3,691,707 | 9/1972 | Von Arx et al. | 51/293 |
| 3,951,619 | 4/1976 | Frangipane | 51/308 |
| 4,247,303 | 1/1981 | Inoue | 51/308 |
| 4,575,384 | 3/1986 | Licht et al. | 51/308 |
| 4,777,155 | 10/1988 | Baba et al. | 51/308 |
| 4,817,341 | 4/1989 | Umeda | 51/295 |
| 4,826,508 | 5/1989 | Schwartz et al. | 51/295 |
| 4,966,055 | 10/1990 | Staggs | 51/295 |

*Primary Examiner*—Mark L. Bell
*Assistant Examiner*—Willie J. Thompson
*Attorney, Agent, or Firm*—Cahill, Sutton & Thomas

[57]         ABSTRACT

A dicing blade is formed by plating a composition of diamond particles and silicon carbide whiskers suspended in a nickel solution upon an aluminum hub. To obtain bonding rather than capturing of the diamond particles, nickel coated diamond particles may be used to form an inter-metallic bond between the coated diamond particles, the silicon carbide whiskers and the nickel matrix.

21 Claims, 3 Drawing Sheets

DICING BLADE COMPOSITION

BACKGROUND OF THE INVENTION

1. Field of the Invention

The present invention relates to dicing blades and, more particularly, to an enhanced composition of a dicing blade for providing increased strength, cutting capability and accuracy.

2. Description of the Related Art

Wafer saws having dicing blades have been used by the semiconductor industry for decades to cut or dice substrates, often referred to as wafers, into separate pieces or die. Numerous manufacturers provide such wafer saws to the industry. Typically, the wafer saw includes an aluminum hub mountable upon a rotatable spindle. The dicing blade is in the nature of a radially oriented annular band plated to the peripheral radial side of the hub. It extends past the perimeter of the hub. A wafer saw having a dicing blade of this type is disclosed and described in U.S. Pat. No. 3,691,707.

Construction of the dicing blade begins with a formed aluminum hub mounted upon a titanium mandrel. An O-ring seal or the like is placed adjacent the hub radially interiorly from the perimeter to serve as a mask and permits selective plating only on the annular area where the dicing blade is to be formed. The plating tank includes a nickel plating solution having diamond particles suspended therein. The nickel plating solution may be a nickel sulfamate solution sold under various trademarks, such as Allied Kelite, Enthone, SelRex, etc. The diamond particles or abrasive grit is usually sized in the range of two to eight microns. It is maintained in suspension by either mechanical or air agitation. The nickel plating tank may be of various configurations (round, square, etc.). The nickel plating solution is heated to operating temperature by using immersion heaters and automatic temperature controls to maintain a preset temperature to plus or minus two percent. Pure nickel anodes are located within the tank and at an equal spacing about the hub supporting mandrel (cathode). The power or current from a DC power supply is regulated to a current density (amperes per square foot of plating area) suggested by the supplier of the plating solution.

The mandrel, containing one or more hubs, is rotated at a preselected speed for a predetermined duration. Rotation is thereafter stopped to permit the diamond particles to settle on the exposed annular hub area. Rotation is subsequently reversed and then stopped. This cycle is repeated until a desired thickness of nickel and diamond particle composition is reached. Generally, the deposition rate of nickel sulfamate is approximately 0.001 inches (25.4 mm) per hour.

The presently available conventional dicing saw blades produced in accordance with the above described process, or variants thereof, provide a length of cut of wafers in the range of 10,000 to 15,000 inches with a radial wear of the dicing blade in the range of 3 to 5 mils. The thickness of the blades range from approximately 0.6 mil to 4 mils and the kerf formed in the wafer is approximately 1.2 times the thickness of the blade. The additional thickness of the kerf over that of the blade is generally attributed to a certain amount of wobble that occurs. Because of such wobble, the structural integrity of the blade is compromised. To reduce the probability of a ruined wafer as a result of a broken or shattered dicing blade, it is an industry wide standard procedure to discard the dicing blades after 5,000 to 15,000 inches of cut.

SUMMARY OF THE INVENTION

A dicing blade is formed by plating a composition of diamond particles and silicon carbide whiskers suspended in a nickel solution upon an aluminum hub. The carbide whiskers become plated with the nickel and aluminum hub, not just captured as are the diamond particles, to form a structurally robust blade. To further enhance the dicing blade, nickel coated diamond particles may be used whereby an intermetallic bond is formed between the coated diamond particles, the silicon carbide whiskers and the nickel matrix.

It is therefore a primary object of the present invention to provide a strength enhanced dicing blade.

Another object of the present invention is to provide a low wear rate for a dicing blade.

Yet another object of the present invention is to increase the useful life of a dicing blade by increasing its strength.

A further object of the present invention is to bond the components of a dicing blade with one another.

A still further object of the present invention is to provide an intermetallic matrix of different components constituting a dicing blade.

A yet further object of the present invention is to provide a method for fabricating a dicing blade.

These and other objects of the present invention will become apparent to those skilled in the art as the description of the invention proceeds.

BRIEF DESCRIPTION OF THE DRAWINGS

The present invention will be described with greater clarity and specificity with reference to the following drawings, in which.

DESCRIPTION OF THE PREFERRED EMBODIMENT

Figure 1:
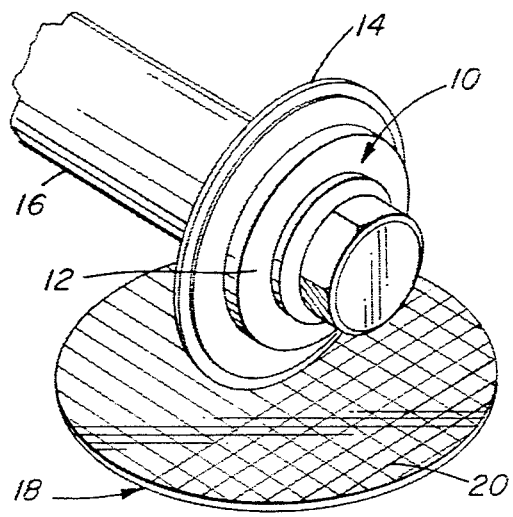
FIG. 1 illustrates a spindle mounted dicing blade performing a cutting action across a wafer.

Referring to FIG. 1, there is shown a substrate or wafer saw 10 formed by a hub 12 and a dicing blade 14. The hub is mounted upon a rotatable spindle 16. The blade is mounted in relation to a wafer 18 in order to make a plurality of parallel cuts 20 during successive passes of the rotating blade. After the wafer has been cut into a plurality of strips, the wafer is rotated 90° and a plurality of second cuts are made. The second cuts produce a plurality of pieces or die from the wafer.

These die are subsequently acted upon to form various types of semiconductor elements. The above described technology is well known, as evidenced by U.S. Pat. No. 3,691,707.

Figure 2:
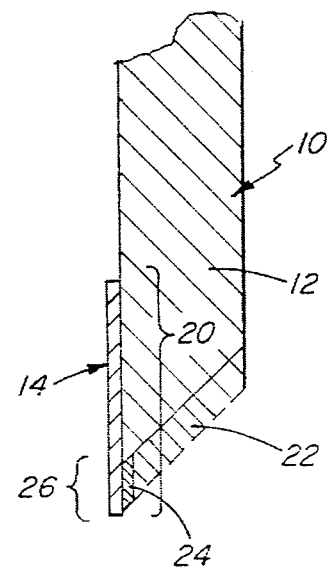
FIG. 2 is a partial cross-sectional view of the perimeter of the dicing blade.

Referring to FIG. 2, there is shown in further detail the relationship between dicing blade 14 and hub 12 of dicing saw 10. Dicing blade 14 is generally a composition of nickel and abrasive grit electroformed by well known plating techniques upon an annular radially aligned band 20 of hub 12. After formation of the dicing blade several mils of the outer edge of the dicing blade are removed by turning the hub on a lathe to remove peripheral section 11. A thin flange 24 is left after the hub has been turned to protect the plated dicing blade; this flange is removed by etching. Exposed section 26 of dicing blade 14 performs the actual cutting of wafer 18. Since the thickness of the cutting blade is in the range of 0.6 to 4 mils (0.0006–0.004 inches) the blade is quite fragile.

Conventional dicing blades are generally discarded after radial wear in the range of 3 to 5 mils (0.003–0.005 inches). Such radial wear is generally equivalent to a cutting distance of 10,000 to 15,000 inches. It is an industry wide practice to discard wafer saws after limited radial wear due to an increasing probability of breakage of the dicing blade. If such breakage occurs, the wafer may be damaged, which damage would incur a substantial loss not warranted by the cost of a dicing blade replacement and attendant down time of the dicing machinery.

Conventionally, nickel plated diamond dicing blades are electroformed upon an aluminum hub using one of several commercial nickel sulfamate solutions. The size of the diamond abrasive grit used is a function of the cutting operation to be performed. Usually, 2 to 8 micron diamond powder or grit is carefully added to the plating solution and maintained in suspension by mechanical or air agitation. During the plating process, the aluminum hubs are rotated at a preselected speed for a predetermined time and then rotation is stopped to allow the diamond grit to settle on the blade. The rotation is reversed and the cycle is repeated until the desired thickness of nickel and diamond grit composition is reached. Because the diamond grit is not electrically conductive, it is captured by the nickel matrix and is more or less encapsulated, depending upon the thickness of the composition and the size of the diamond grit.

Figure 3:
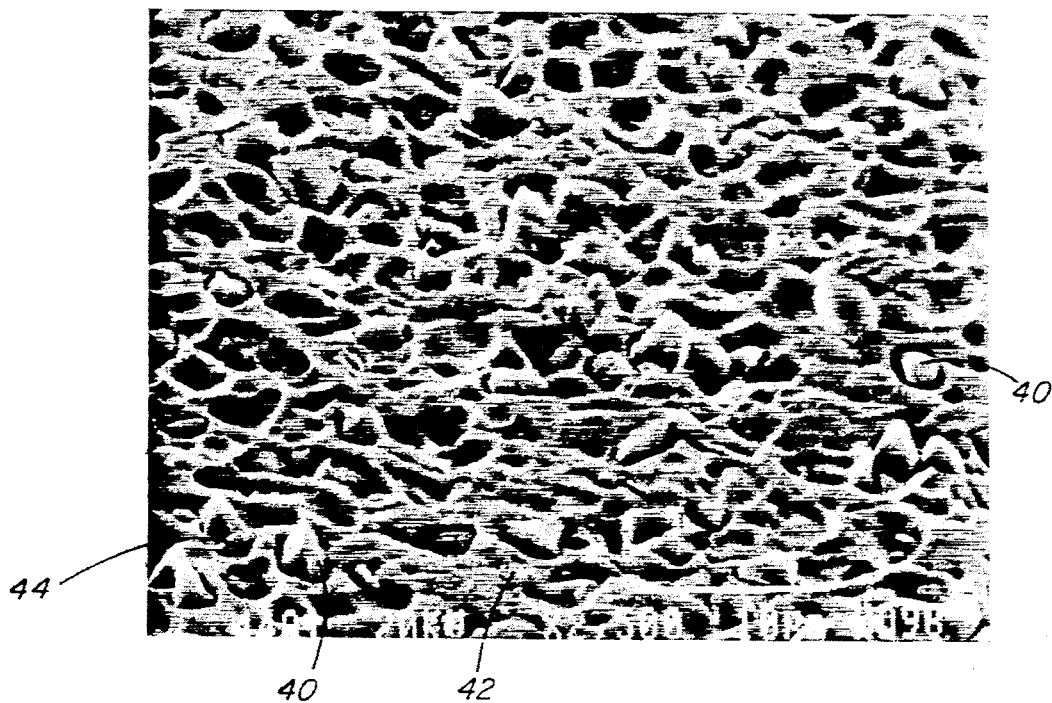
FIG. 3 is a graphic representation of photograph taken with an electron microscope showing the surface of a conventional dicing blade.

Referring to FIG. 3, there is illustrated in graphic form a representation of a photographic image obtained with an electron microscope of a composition of nickel and diamond grit plated upon an aluminum hub. For references purposes, the magnification was 2,500. It illustrates diamond grit 40 dispersed throughout plated nickel 42. Each of diamond grit 40 is lodged in what appears to be a depression 44 generally commensurate in configuration with the embedded configuration of diamond grit 40. It is evident from FIG. 3 that primarily a mechanical attachment retains the diamond grit within the nickel matrix. As a consequence, during wear of the dicing blade, the diamond grit may "fly off" when the mechanical retention provided by the plated nickel is insufficient to maintain the diamond grit captured. The loss of the diamond grit accelerates the wear of the dicing blade.

Figure 4:
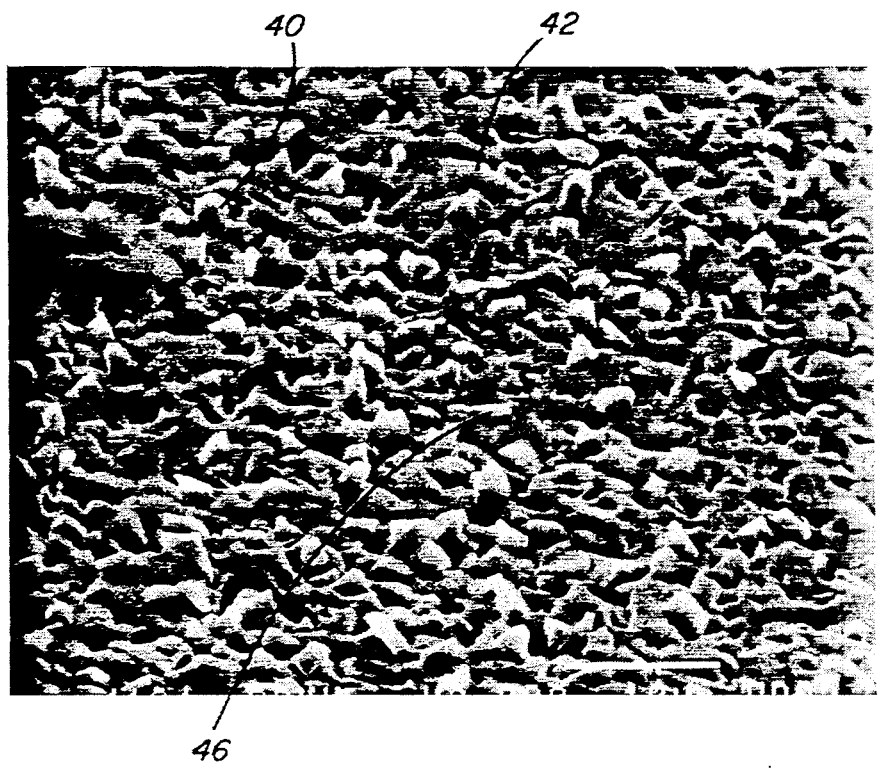
FIG. 4 is a graphic representation of an electron microscope photograph showing a conventional dicing blade surface incorporating silicone nitrade whiskers.

In an attempt to strengthen the structural properties of a conventional dicing blade, a modified composition was developed and dicing blades containing such composition are now commercially available. FIG. 4 illustrates such modified composition. It includes the conventional plated nickel 42 with diamond grit 40 embedded or captured therein. Additionally, silicon nitride whiskers 46 were mixed therewith. The silicon nitride whiskers are elongated rod-like elements randomly dispersed throughout the composition. Because the silicon nitride whiskers are nonconductive, they are embedded and captured within the nickel matrix in the same manner the diamond grit is embedded and captured. Because of the elongated configuration, the silicon nitride whiskers tend to provide strength by transferring the stresses imposed. However, because the silicon nitride whiskers are disposed within commensurately configured cavities and depressions, the extent and degree of transfer of stresses and forces is limited.

Figure 5:
FIG. 5 is a graphic representation of an electron microscope photograph showing silicon carbide whiskers.

FIG. 5 is a graphic representation of a photograph taken through an electron microscope of silicon carbon whiskers used in the composition of the present invention. As noted by the scale, these silicon carbide whiskers may range in length from 30 to 60 microns. The thickness may be in the range of 1 to 2 microns. Of particular significance to the present invention is the fact that silicon carbide whiskers are electrically conductive, as will be discussed in further detail below.

To form a dicing blade of a composition containing diamond grit (or other abrasive grit) and silicon carbide whiskers, silicon carbide whiskers in an amount ranging from 1 to 20 percent by weight of the diamond grit is added to the nickel plating solution along with the diamond grit. During the plating process when a silicon carbide whisker touches the negatively charged surface (aluminum hub or plating formed thereon), it is bonded to and becomes a part of the cathode surface. Thereafter, it is plated with nickel. Simultaneously, the diamond grit resting adjacent the plated surface is captured and mechanically retained in place by the silicon carbide whiskers as well as the plated nickel; thus, the retention of the diamond grit is not solely a function of the pockets (cavities, depressions) of plated nickel capturing the diamond grit but also a function of the mechanical retention capability of the silicon carbide whiskers extending across the diamond grit.

Figure 6:
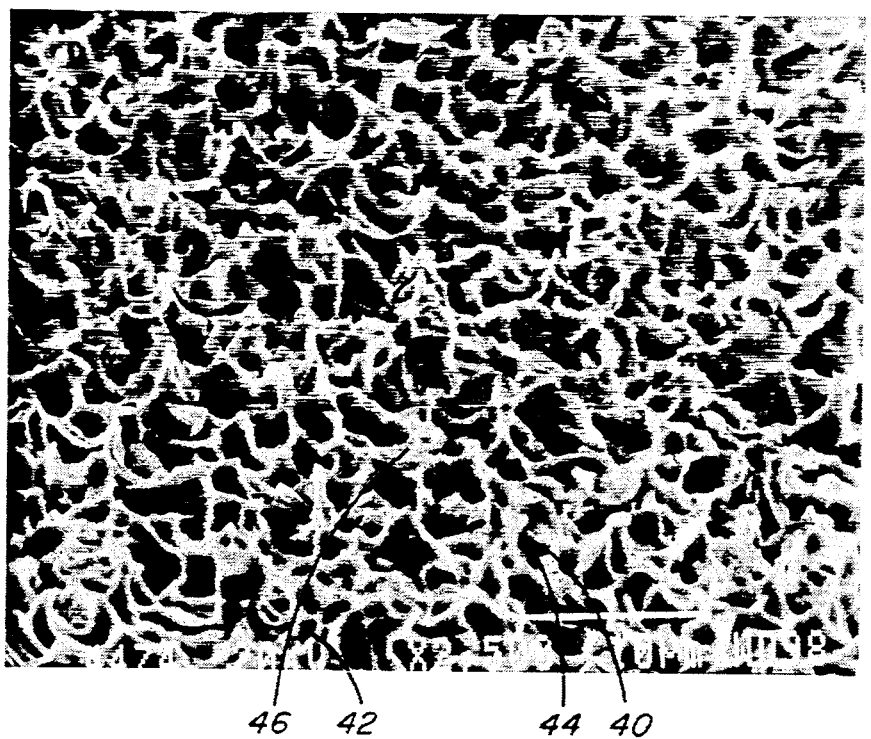
FIG. 6 is a graphic representation of an electron microscope photograph showing the surface of a dicing blade formed with diamond particles and silicon carbide whiskers in a nickel matrix.

Referring to FIG. 6, there is shown a graphic representation of a photograph obtained through an electron microscope of a composition of nickel plating, silicon carbide whiskers and diamond grit. Diamond grit 40 is relatively easy to detect since it is lodged within respective depressions 44 in plated nickel 42. The silicon carbide whiskers, being electrically conductive, become plated by nickel as a result of the electroforming process. Such plating renders them not viewable within the photograph of FIG. 6. However, by visual inspection elongated "bills" of nickel suggest an underlying silicon carbide whisker. For illustrative purposes such a silicon carbide whisker is depicted by dashed line 46.

Figure 7:
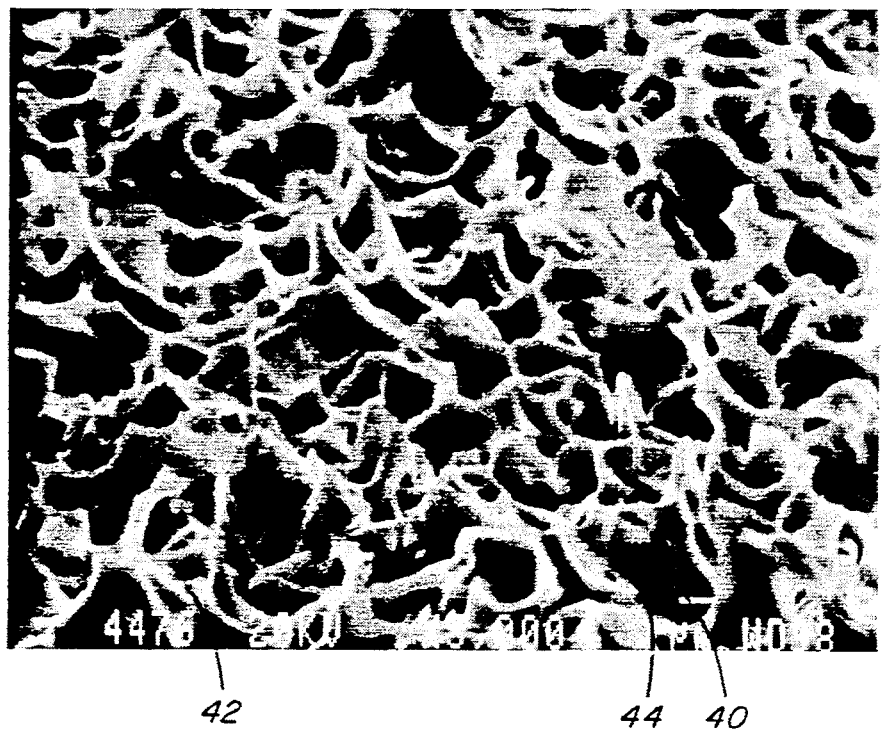
FIG. 7 illustrates the surface shown in FIG. 6 at double the magnification.

Referring to FIG. 7, there is shown a similar surface of the same composition of elements shown in FIG. 6 but at a magnification of 5,000 instead of 2,500 depicted in FIG. 6. Even with such greater magnification, only diamond grit 40, its related depressions 44 and plated nickel 42 is visible.

For reasons not presently fully understood, it is noted that the texture of the surface depicted in FIGS. 6 and 7 is substantially more sharp, abrasive and rough than the surface of the dicing blade shown in either of FIGS. 3 or 4. Since the only difference in composition is that of the presence of the silicon carbide whiskers, it is presumed that the less smooth surface results therefrom. It is surmised that the growth pattern exhibited in FIGS. 6 and 7 results because the plated nickel extends in many directions, partly as a function of the direction of the multitude of silicon carbide whiskers since such whiskers are plated and not just covered with nickel plating. Because of such plating, the strength of the silicon carbide whiskers has increased since the nickel plating is bonded to and does not just "capture" each whisker. Moreover, the random orientation of the silicon carbide whiskers alters the grain structure of the plated nickel from a previously existing single direction.

Testing performed on a dicing saw containing a dicing blade made with a composition of nickel plating, diamond grit and silicon carbide whiskers indicated a 1 mil wear radially after making cuts totalling in length 156,000 inches. This amounts to essentially a tenfold increase in cutting length per mil of radial wear. The specific reasons for such phenomenal advantages are not presently fully understood. However, it is believed that several factors are present, including the capture of the diamond grit within the silicon carbide whiskers which restrains the diamond grit from becoming radially dislodged (flying off) from within the respective depressions. This additional retention of the diamond grit contributes to the longevity of the blade in that the diamond grit performs its cutting function for a longer period of time. The matrix formed due to the nickel plating of the silicon carbide whiskers is believed to be more robust and structurally more capable of withstanding the stresses imposed during cutting of a wafer whereby less physical damage (particularly from wobble) to the dicing blade occurs.

Nickel coated diamond powder is now commercially available. By using such nickel coated diamond powder or grit in place of the conventional diamond grit, it is believed that enhanced properties in the dicing blade will result. With such coating, the nickel will be plated directly upon and about the diamond grit whereby the diamond grit will become bonded to the nickel plating, not just captured therewithin. Moreover, the diamond grit would become bonded with the silicon carbide whiskers and form a robust union therebetween. Thus, there will be no longer any free standing, captured but not bonded, particles in the dicing blade. Accordingly, the dicing blade would be formed as a result of an intermetallic bond between the nickel coated electrically conductive diamond grit, the electrically conductive silicon carbide whiskers and the nickel.

While the principles of the invention have now been made clear in an illustrative embodiment, there will be immediately obvious to those skilled in the art many modifications of structure, arrangement, proportions, elements, materials and components used in the practice of the invention which are particularly adapted for specific environments and operating requirements without departing from those principles.

I claim:

1. A dicing saw blade for cutting wafers into die, said dicing saw blade comprising in combination:
    a) an aluminum hub; and
    b) a dicing blade electroplated upon said hub, said dicing blade being of a composition including at least nickel, diamond grit and silicon carbide whiskers.

2. The dicing saw blade as set forth in claim 1 wherein said diamond grit is nickel coated diamond grit.

3. The dicing saw blade as set forth in claim 1 wherein said diamond is grit coated with electrically conductive material.

4. A dicing saw blade mountable upon a rotatable spindle to rotate said wafer saw for cutting wafers into die, said wafer saw comprising in combination:
    a) a hub mountable upon the rotatable spindle; and
    b) a dicing blade secured to said hub, said dicing blade being formed from an electroplated composition including at least an electrically conductive plating material, whiskers of electrically conductive material and an abrasive grit retained by said plating material and said whiskers.

5. The dicing saw blade as set forth in claim 4 wherein said abrasive material is diamond grit.

6. The dicing saw blade as set forth in claim 4 wherein said abrasive material is diamond grit coated with electrically conductive material responsive to electroplating with said plating material.

7. The dicing saw blade as set forth in claim 4 wherein said whiskers are silicon carbide whiskers.

8. A dicing saw blade for cutting wafers into die, said dicing saw blade comprising in combination:
    a) a hub of electrically conductive material; and
    b) a dicing blade electroformed on said hub, said dicing blade being formed from a plating solution containing abrasive grit and electrically conductive whiskers.

9. The dicing saw blade as set forth in claim 8 wherein said whiskers comprise silicon carbide whiskers.

10. The dicing saw blade as set forth in claim 9 wherein said abrasive grit comprises diamond grit.

11. The dicing saw blade as set forth in claim 9 wherein said abrasive grit comprises diamond grit covered with electrically conductive material.

12. The dicing saw blade as set forth in claim 8 wherein said abrasive grit comprises diamond grit.

13. The dicing saw blade as set forth in claim 12 wherein said abrasive grit comprises diamond grit at least partially coated with electrically conductive material.

14. A dicing saw blade for cutting wafers into die, said dicing saw blade comprising in combination:
    a) a hub of electrically conductive material; and
    b) a dicing blade electroplated on said hub, said dicing blade comprising a matrix of plating material, abrasive grit and electrically conductive whiskers.

15. The dicing saw blade as set forth in claim 14 wherein said whiskers comprise silicon carbide whiskers.

16. The dicing saw blade as set forth in claim 14 wherein said abrasive grit comprises diamond grit.

17. The dicing saw blade as set forth in claim 14 wherein said abrasive grit comprises diamond grit coated with electrically conductive material.

18. The dicing saw blade as set forth in claim 17 wherein said whiskers comprise silicon carbide whiskers.

19. The dicing saw blade as set forth in claim 18 wherein said plating material comprises nickel.

20. A dicing saw blade comprising a hub of electrically conductive material and a dicing blade formed by the steps of electroplating an annular radially aligned band of nickel, abrasive grit and silicon carbide whiskers on said hub and removing an annular section of said hub to expose opposed sides of said dicing blade.

21. The dicing saw blade as set forth in claim 20 wherein the abrasive grit is diamond grit coated with an electrically conductive material and including the steps of forming an intermetallic matrix of nickel, diamond grit and silicon whiskers during said step of electroplating.

* * * * *